(12) United States Patent
Gibbons et al.

(10) Patent No.: US 6,383,687 B1
(45) Date of Patent: May 7, 2002

(54) PRODUCTION OF A POROUS FOAM PRODUCT FOR BATTERY ELECTRODES

(75) Inventors: Daniel W. Gibbons, Medfield, MA (US); Michael F. Cahill, Mentor, OH (US)

(73) Assignee: Stork Screens, B.V., Al Amersfoort (NL)

(*) Notice: Subject to any disclaimer, the term of this patent is extended or adjusted under 35 U.S.C. 154(b) by 0 days.

(21) Appl. No.: 09/338,427

(22) Filed: Jun. 23, 1999

Related U.S. Application Data

(60) Provisional application No. 60/091,117, filed on Jun. 29, 1998.

(51) Int. Cl.[7] .................................................. H01M 2/00
(52) U.S. Cl. ........................................ 429/233; 144/209
(58) Field of Search .......................... 429/223, 231.95; 82/47; 144/209

(56) References Cited

U.S. PATENT DOCUMENTS 4,413,540 A * 11/1983 Burge ............................ 82/47
5,512,222 A    4/1996 Sabol et al.
5,738,907 A * 4/1998 Vaccaro et al. ............. 427/172

FOREIGN PATENT DOCUMENTS

| JP | 62243245 | 10/1987 |
| JP | 63019235 | 1/1988 |
| JP | 03226969 | 10/1991 |
| JP | 09153365 | 10/1997 |

* cited by examiner

*Primary Examiner*—Gabrielle Brouillette
*Assistant Examiner*—M. Wills
(74) *Attorney, Agent, or Firm*—Michele M. Tyrpak; Hudak & Shunk Co., LPA

(57) ABSTRACT

A porous product, typically a foam sheet, can be produced by peeling of a foam supply. By peeling the foam supply along its z axis, a product is produced having pores with a uniform pore aspect ratio in the longitudinal direction. Such a porous product, when containing an active filler, can be used as a battery electrode. The electrode can have enhanced electrical and mechanical properties.

30 Claims, 2 Drawing Sheets

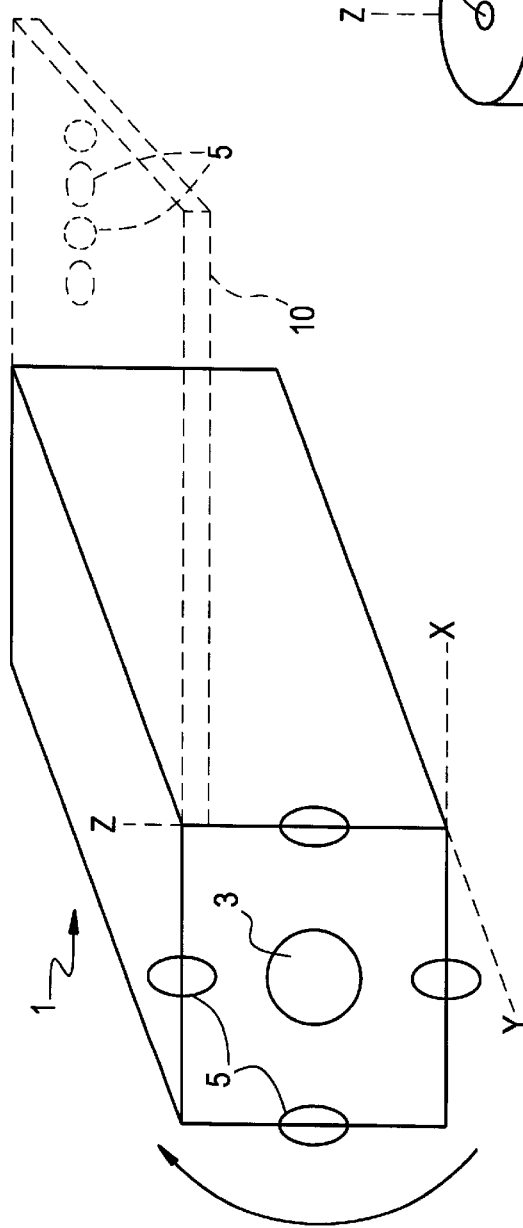
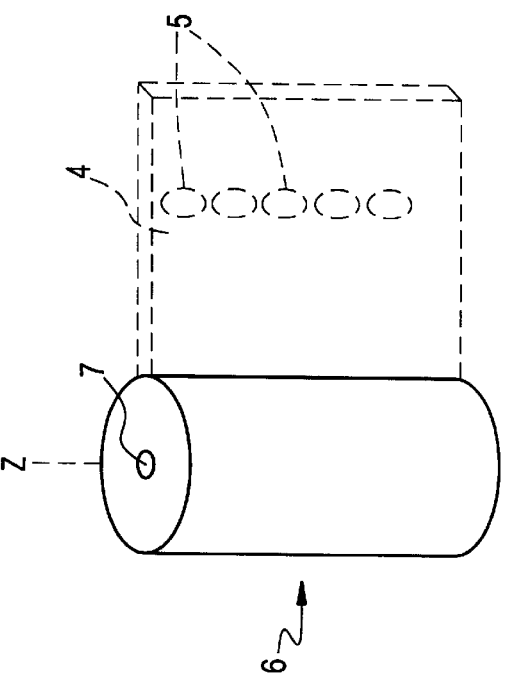

PRODUCTION OF A POROUS FOAM PRODUCT FOR BATTERY ELECTRODES

CROSS-REFERENCE TO RELATED APPLICATION

This application claims the benefit of U.S. Provisional Application No. 60/091,117 filed Jun. 29, 1998.

FIELD OF THE INVENTION

The present invention relates to the manufacture of a porous foam product and an electrode made from the porous foam product. The porous foam product, when filled with an appropriate active material, is useful as a battery electrode.

BACKGROUND OF THE INVENTION

Reticulated porous products, such as a reticulated polyurethane foam, are generally made in a continuous manner in a block or log form. For example, in U.S. Pat. No. 5,512,222 there is disclosed a method of producing a continuous slab of polymeric foam in which a mixture of liquid foam reactants is introduced into the bottom interior portion of a trough with an open top. The foam mixture then expands upwardly in the trough.

The blocks, often shaped somewhat like a loaf of bread, are then "peeled" around a core, which is oriented along a major axis of the foam, typically the x axis, i.e., the width of the block, or around the y axis, i.e., the length of the block. This method permits the largest flexibility for peeling long continuous strips in maximum width while minimizing waste. Peeling in this manner produces a foam with pores whose aspect ratio varies in a periodic manner from round to oval.

This produces a product with physical properties that vary in the longitudinal direction, i.e., y-axis direction.

There is still a need for continuously and efficiently producing a sponge-like porous article in strip form which can be utilized, for example, in preparing high density, high capacity battery electrodes. It would be desirable to prepare such articles not only having the desired electrical properties, but also tailored to achieve enhanced mechanical properties.

SUMMARY OF THE INVENTION

The present invention pertains to making porous products including metal foams that can serve as the matrix material for battery electrodes having high current density, high capacity characteristics. The porous products, typically in the form of metal foam sheets, can further have enhanced tensile strength and elongation, and lower resistivity. They furthermore exhibit lower longitudinal weight variation. When filled and serving as battery electrodes, the articles can exhibit higher battery capacity, decreased variation in cell capacity, and higher voltages during high drain rates.

In one aspect, the invention is directed to the method of producing a three-dimensional reticulated sheet of polymeric foam from a prepared first mass of polymeric foam, wherein the prepared first mass of polymeric foam has a y axis length, an x axis width, and a z axis height, and the polymeric foam sheet can be produced from the prepared first mass by peeling the sheet from the first mass in a plane at least substantially parallel to the y axis length, the improvement in the method of producing polymeric foam sheet comprising the steps of:

establishing a second mass of foam from the prepared first mass of polymeric foam, the foam second mass retaining the x, y and z axes of the prepared first mass;

shaping the foam second mass for peeling the foam in a plane at least substantially parallel to the z axis; and peeling a sheet of polymeric foam, from the shaped foam second mass in a plane at least substantially parallel to the z axis.

In another aspect, the invention is directed to a method of producing an electrode for a battery, comprising the steps of:

providing a foam support member, with the support member having a multitude of pores;

establishing the foam support member in sheet form, having a sheet length in the longitudinal direction and a sheet width in the transverse direction, with the pores having a uniform pore aspect ratio in the longitudinal direction;

coating the foam support member with an electroconductive coating; and introducing active material into the sheet form electrode support member to produce an electrode in sheet form containing the material in the sheet.

In yet another aspect, the invention is directed to an apparatus for preparing a three-dimensional reticulated sheet of polymeric foam from a prepared first mass of polymeric foam, wherein the prepared first mass of polymeric foam has a y axis length, an x axis width, and a z axis height, and the polymeric foam sheet can be produced from the prepared first mass by peeling the sheet from the first mass in a plane at least substantially parallel to the z axis, which apparatus comprises:

foam supply production means producing a polymeric foam mass having a y axis longitudinal direction; and cutting means severing the foam supply into sheet form having a length along the z axis of the foam mass.

In a still further aspect, the invention is directed to a porous foam article, which article is a three-dimensional reticulated foam article having a substantially cylindrical outer surface, and having an x-axis radius, a y-axis radius and a z-axis height, wherein the outer surface is cylindrical around the z-axis, the article consisting of a multitude of pores, the article providing a uniform pore aspect ratio in the longitudinal direction for a sheet of foam severed from the article, wherein the sheet has longitudinal direction in the x-axis direction.

BRIEF DESCRIPTION OF THE DRAWINGS

Further features of the present invention will become apparent to those skilled in the art to which the present invention relates from reading the following specification with reference to the accompanying drawings, in which:

FIG. 1A is a perspective view of a machine-produced foam mass in block form having x, y and z axes and showing the present practice of a sheet of foam, shown in phantom, peeled from the foam mass around the y axis.

FIG. 3 is a perspective view of the prepared foam mass of FIG. 2, representative of the present invention, and showing, in phantom, a sheet of foam peeled from the mass around the z axis.

DESCRIPTION OF THE PREFERRED EMBODIMENTS

Figure 1:
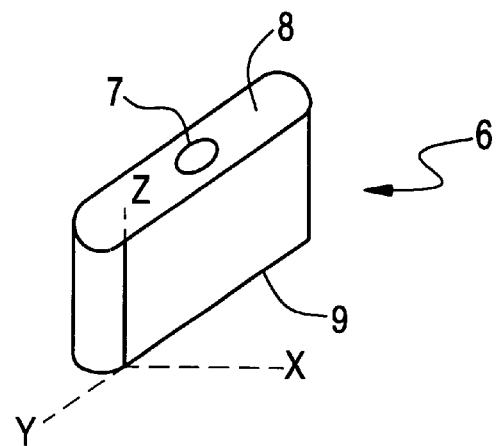
FIG. 1 is a perspective view of a prepared foam mass of substantially cylindrical form.

The polymeric foam produced, generally as a strip of conductive reticulated foam, can comprise any of a variety of stretchable foams, including organic or inorganic open-cellular materials. Synthetic or natural fiber foams, including flexible paper or wood products can also be useful. Preferably, the substrate material is one which has open interconnected cells. The term "reticulated foam" as used herein shall include all such substrate materials.

Useful reticulated polymeric foams which may be employed are any of those polymeric substrates which are conventionally used for preparing polymer foams such as polyurethanes, including a polyether-polyurethane foam or a polyester polyurethane foam; polyesters; olefin polymers, such as a polypropylene or polyethylene; vinyl and styrene polymers, and polyamides. Examples of commercially available preferred organic polymer substrates include polyurethane foams marketed by Foamex International, Inc., including polyether-polyurethane foams, and polyester polyurethane foams.

The article produced in the present invention can be referred to as a porous article sometimes referred to as a "porous product" or, for convenience, simply as a "foam". The porous product is preferably an open-cell three dimensional product having continuously connected strands. This may be referred to herein as a product having "open interconnected cells". The porous product will usually be in sheet form, i.e., have a thickness dimension less than its width or length. More particularly, the product produced will usually be in strip form, having a thickness that is less than the product width, and a width that is less than the product length.

The starting foam material, usually referred to herein as a "machine-produced" mass of foam, or "prepared first mass" of foam, can have a length in the longitudinal direction. Additionally, the mass will have a width that may be referred to herein as a width in the transverse direction. The porous product in strip form provided from the first mass will be in a planar, e.g., plate-like or sheet form having broad, front and back major faces that are usually flat. By way of example, machine-produced polymeric foams may have widths in the transverse direction on the order of 6 to 80 inches, and be produced in continuous lengths which can run as great as on the order of 1000 feet or more.

Referring to the figures, and more particularly to FIG. 1A, the polymeric foam is first typically produced then as a foam mass 1 in a log, bun or loaf form, i.e., the "machine-produced foam" or "prepared first mass of foam". A foam first mass prepared in this manner will have three axes, x, y, and z, conforming to width, length and height, respectively, as shown in the figure. The x, y, and z axes are to be understood to be at 90° angles to one another, unless otherwise stated herein. It is to be understood that the terms "x", "y", and "z" in reference to the axes are used herein as terms of convenience to provide an understanding of the orientation of the foam starting material, usually by reference to the drawings. Such terms should not be construed as limiting the invention unless expressly stated herein as such. The foam mass 1 will contain pores 5 that can be visible on the surfaces of the foam mass 1.

This machine-produced first mass of foam 1 is then peeled into a sheet or strips, which, in accordance with the prior art process, is generally while the prepared machine-produced mass of foam 1 is spinning around the longitudinal y-axis, as represented by the directional arrow in FIG. 1A. Before peeling, paring of the foam mass 1 may be employed to remove any rough edges and to shape the mass of foam 1 into a cylindrical shape. Spinning of the foam mass 1 in this manner may be facilitated by placement of a supporting core member (not shown) within an aperture 3 that runs through the center of the prepared machine-produced foam mass 1 in the direction of the longitudinal y-axis. The aperture 3 is thus present along the y axis center line of the foam 1. The aperture 3 may be cut through the first mass 1 and be positioned along the same axis around which the machine-produced first mass 1 will be spun. The machine-produced foam mass 1 as it comes into contact with a cutting means (not shown) such as by spinning around the core member, can provide for a peeling of the machine-produced mass of foam 1 that results in the emergence from such application of a "strip" or "sheet" of foam 10.

In the peeling of the foam, the resulting strip 10 will have a length in the longitudinal or x axis direction and a width in the transverse or y axis direction. Production of foam strip or sheet 10 in this manner yields pores 5 in the sheet 10, some of which will be circular and some of which will be oval, with the oval pores having a long axis in the machine-produced or x axis direction of the mass 1. Rotation of the log clockwise, as depicted in FIG. 1A, yields pore shapes 5 of circular, oval, and back to circular across the width or y axis of the strip 10. This variation in the machine-produced or x axis direction results in variability in properties of the foam sheet 10, as will be most particularly discussed hereinbelow in connection with the examples.

Referring, then, to a representative embodiment of the present invention, in FIG. 1, a prepared second mass of foam 6 is shown having "x", a "y" and "z" axes oriented in the same manner as the foam 1 of FIG. 1A. The x, y and z axes correspond to width, length and height, respectively. The x, y, and z axes are established at 90° angles to one another. The prepared second mass of foam 6 can be produced by cutting away at the outside of the machine-produced foam 1 (FIG. 1) so as to establish a substantially cylindrical shaped second mass of foam 6. Such a substantially cylindrical shaped mass of foam 6 shall be referred to herein as a "second foam mass" or "prepared foam mass". Upon shaping, the second foam mass 6 retains the three dimensional character of the machine-produced foam 1, having x, y and z axes, but having a cylinder center line in the z-axis direction. The second foam mass 6 may be smaller than the machine-produced foam mass 1. An aperture 7 can then be introduced into and through the center of the prepared foam mass 6 in a manner such that the aperture is at least substantially parallel to the z axis of the prepared foam mass 6.

Figure 2:
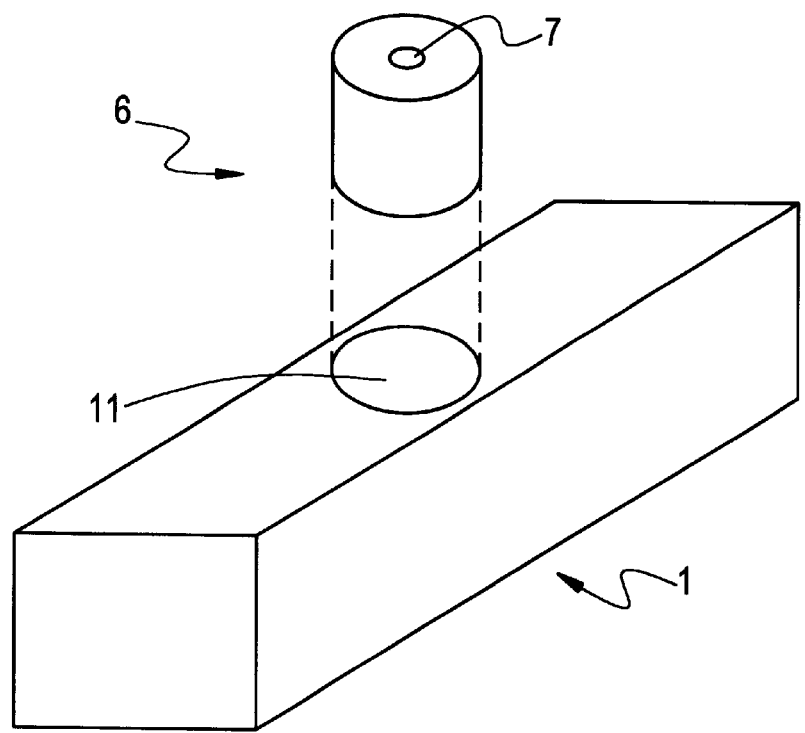
FIG. 2 is a perspective view of a prepared foam mass obtained by coring of the machine-produced foam mass, which can be a mass as shown in FIG. 1A.

In FIG. 2, there is then depicted an alternative arrangement by which the prepared foam mass 6 may be obtained in which the machine-produced foam mass 1 may be cut as by coring. Removing the second mass 6 from the first mass 1 leaves an aperture 11 in the first mass 1. Such coring occurs in a manner essentially parallel to the z-axis of the machine-produced foam 1. By such a procedure, a portion of the machine-produced foam mass 1 is prepared as a substantially cylindrical, prepared foam mass 6. As in FIG. 1, an aperture 7 can be introduced into and through the center of the prepared foam mass 6 in a manner at least substantially parallel to the z axis of the prepared foam mass 6.

Referring then to a representative process, reference can be made to FIG. 3. In FIG. 3, a prepared foam mass 6 in cylindrical form is positioned by securing means (not shown) such that the cylinder center line is at least essentially along the z-axis. The prepared foam mass 6 is then spun in a direction around the z-axis. Contemporaneous with spinning, the prepared foam mass 6 is engaged with means (not shown) for peeling a sheet 4 of foam from the foam mass 6. The means for peeling is established so as to be at least substantially parallel, and preferably completely parallel, to the z-axis.

By this spinning and cutting action, a thin continuous layer of foam sheet 4 is peeled from the prepared foam mass 6. Such peeling occurs in a plane at least substantially parallel to the z axis. Production of foam sheet 4 in this manner yields uniform pores 5 in the sheet 4 of at least substantially circular shape. It. should be noted, however, that pore shape in FIG. 3 is exaggerated for clarity.

It is contemplated that means for securing (not shown) the prepared foam mass 6 to facilitate spinning of the prepared foam mass 6 around the z axis may be used. Such securing means may constitute a mandrel positioned through the aperture 7 of the prepared foam mass 6. Where the center aperture 7 is absent from the prepared foam mass 6, it is further contemplated that such securing means may constitute clamps positioned on a top 8 and a bottom 9 of the prepared foam mass 6 such that the prepared foam mass 6 is freely moveable in the direction of rotation around the z axis. However, it is to be understood that the terms "top" and "bottom" are used herein for convenience to provide a better understanding of the positioning of the securing means. Such terms should not be construed as limiting the invention unless expressly stated herein as such.

The means for peeling of a foam mass into a sheet 4 may be any means, e.g., a cutting means, such as may be conventional in the industry. The means can include a blade, knife or heated wire. It is contemplated that peeling may occur by advancement of the foam mass 6 into the cutting means. It is also contemplated that the foam mass 6 could remain stationary and the cutting means be advanced into the foam mass. Alternatively, it is within the scope of the present invention that the foam mass 6 could be spun around the z-axis, but the foam mass 6 be otherwise held in a stationary position, e.g., not advanced in a forward manner, such that a hot wire run through the foam mass 6 in a spiral manner can produce a foam sheet 4.

Notwithstanding the manner in which the foam sheet 4 is produced, a representative sheet of polymeric foam produced by the method of the present invention, then, will be an open cell foam sheet 4 having a thickness within the range from about 0.5 mm to about 10 mm. However, depending on the battery cell type and application, this thickness will vary. The foam sheet 4 may have an average number of pores per inch within a wide range, typically within a range from about 10 to about 150 pores per inch (ppi). The average number of pores per inch is dictated by application. For instance, for an electrode suitable for a nickel cadmium battery, it may be desirable to utilize a polymer foam having from about 40 to about 110 ppi. Additionally, by the present invention, the pore shape of the polymeric foam product will display a uniformity in pore aspect ratio in the longitudinal direction.

An application of the preferred porous foam sheet 4 can be where it is utilized to prepare a battery electrode. In such application, the precursor material may have some electrical conductivity. For a polymer foam, this can be achieved by employing any of a number of well-known procedures such as coating with a latex graphite; coating with a metal powder as described in U.S. Pat. No. 3,926,671; electroless plating with a metal such as copper or nickel; sensitizing by application of a metal such as silver, nickel, aluminum, palladium or their alloy as described in U.S. Pat. No. 4,370,214; application of a paint containing carbon powder, or a metal powder such as silver powder or copper powder; coating of a pore-former as described in U.S. Pat. No. 4,517,069; and vacuum deposition of a metal by cathode sputtering with a metal or alloy as disclosed in U.S. Pat. No. 4,882,232. One suitable electroless plating process is disclosed in the EPO published application 0 071 119. Polyurethane foams which are made conductive by coating with a latex graphite are commercially available and are marketed by Foamex International, Inc.

A continuous production process for preparing a preferred metal foam support member in sheet form using an open-cell foam plastic sheet as a starting material, and using electroplating has been taught in U.S. Pat. No. 4,978,431. In addition, U.S. Pat. No. 5,300,165 proposes a similar method for the manufacture of metallic porous sheets from mesh sheets and non-woven fabric sheets, which can be layered together. Where a preferred porous metal support member is made and electroplating of an open-cell foam is involved, the plating is often nickel plating and the resulting porous nickel sheet will generally have a weight within the range of from about 200 grams per square meter, up to about 5,000 grams per square meter, basis square meters as measured on a major face of the resulting metal foam support member. More typically, this will be a sheet weight within the range of from about 400 to about 700 grams per square meter.

Generally, if electroplating has been utilized, after the completion of the plating, the resulting metallized article can be washed, dried, and may be thermally treated, e.g., to decompose a polymer core substance. In some instances, the article may be annealed, such as in a reducing or inert atmosphere. Regarding thermal decomposition, U.S. Pat. No. 4,687,553 suggests a multi-stage heat decomposition method. According to the Patent, when nickel is plated, thermal decomposition is conducted at a temperature in the range of about 500° C.–800° C. for up to about three hours depending on the plastic foam (polymer core substance) used, followed by annealing in an inert or reducing atmosphere at a temperature in the range of about 800° C.–1100° C.

The foam substrate can then be filled with an active material. For preparing an electrode, the active material for a negative battery electrode can be a hydrogen storage material, generally the $AB_2$ type hydrogen storage alloy, or an $AB_5$ type hydrogen storage alloy. In the $AB_2$ type, A can be an element with a large affinity for hydrogen such as Zr or Ti, and B is a transition metal such as Ni, Mn, or Cr. Members of the $AB_2$ class of hydrogen-absorbing materials may also include the binary $ZrCr_2$, $ZrV_2$ and $ZrMo_2$, although all of this class of hydrogen-absorbing material are contemplated as being useful in the present invention. The $AB_5$ class of alloys can be referred to as the rare-earth (Misch metal) alloys based around lanthanum nickel. Thus, A can be represented by lanthanum, while B might be defined as above. The $AB_5$ type negative materials for battery negative electrodes are well known and many materials are described in the prior art. All such hydrogen storage alloys are contemplated as useful in preparing a negative electrode of the present invention. For a nickel-cadmium battery, the negative electrode cadmium active material will comprise cadmium metal.

Where the metal foam support member 1 is to be formed for use as a positive electrode, any of the positive electrodes as are conventional or as are contemplated for use in a battery will be useful in the present invention. Typically, such a positive electrode will contain a positive active material, usually composed of a metal oxide, in a support. A representative active material comprises nickel oxyhydroxide. Additionally, for the positive active material, there may be used a lithiated transition metal intercalation compound.

Regardless of the active material utilized, such material will generally be made into a paste or slurry, typically using water or an organic solvent, although it is contemplated that the use of dry, finely divided active material, may also be employed. The paste or slurry is then introduced into the metal foam support member 1, such as by any process for introducing a paste or slurry material into a foam type substrate, e.g., roll coating, spray application, or pressure or vacuum application.

Electrodes in the battery can be separated with a usually synthetic, typically non-woven material. The separator may serve as an insulator between electrodes as well as a medium for absorbing an electrolyte, e.g., an alkali electrolyte. A representative separator material is a nylon or a polypropylene non-woven fabric. The polypropylene fabric could be of sulfonated polypropylene. The separator may have, for example, on the order of a 60 percent to 70 percent porosity. A serviceable electrolyte solution for a nickel metal hydride battery can be an aqueous potassium hydroxide solution. Such solution may contain lithium hydroxide, e.g., a 35 weight percent electrolyte solution with 1 percent LiOH.

The following examples show ways in which the invention has been practiced but should not be construed as limiting the invention.

EXAMPLE 1

A commercially available, open cell foam in long log form having a y axis length in excess of 150 meters (m), which was grade Z-110 polyurethane foam available from Foamex International, Inc., was prepared. Several short loaves were cut from the long log and some of these loaves were peeled around the y-axis of the loaf. These sheets were coiled into roll form. Several other of the short loaves were peeled around the z-axis of the loaves to prepare sheets that were also provided in roll form. For purposes of this example, test material from the y-axis peeled loaves will be referred to as the comparative product. The test material from the z-axis peeled loaves are the invention product.

Rolls of each peeled foam were then made conductive by coating of a carbon-based paint. The resulting foam, having initial conductivity, was then electroplated in the continuous plating apparatus of U.S. Pat. No. 5,098,544. The electroplate bath was a nickel-sulfamate bath maintained at a pH of about 3.7 and a temperature of about 55° C. The nickel plated foam was then annealed at a temperature of 950° C. for a time of about 7 minutes in a hydrogen atmosphere.

Sample coupons were cut from each of the y axis peeled and z-axis peeled sheets and each coupon was about 20 mm in width by 150 mm in length. Plated coupon samples from 90 rolls of y-axis peeled foam were weighed and found to have an average weight of 498 grams per square meter ($g/m^2$) which units in $g/m^2$ for this foam in sheet form are conventional in the industry. Plated coupon samples from 10 rolls of the z-axis peeled foam were weighed and found to have an average weight of 505 $g/m^2$. Samples were also measured and found to have a thickness of 1.67 mm and 1.65 mm respectively.

Plated coupon samples of the z-axis peeled foam were then inserted in an Instron Model 4411 tensile tester for testing tensile strength. The results of testing 24 samples indicated a longitudinal tensile strength, expressed as kilograms per two centimeters (kg/2 cm) of 5.93, which units of kg/2 cm are conventional in the industry. Similar 20 mm×150 mm samples tested showed an average transverse tensile strength for the plated coupon samples of 4.89 kg/2 cm. This compares with a longitudinal tensile strength of 5.65 kg/2 cm and transverse tensile strength of 3.38 kg/2 cm for plated coupon samples of the y-axis peeled product tested in the same manner. This is a longitudinal strength increase of 5% and a transverse strength increase of 45% for the z-axis peeled product.

During tensile test, the samples were also evaluated for elongation. For elongation, the samples were stretched with the tensile apparatus and the elongation is the distance traveled, expressed as a percentage, at peak tensile strength. For the z-axis peeled samples, the longitudinal elongation was 8.02% and the transverse elongation was 11.9%. This compares with a longitudinal elongation of 6.5% and transverse elongation of 12.4% for the y-axis peeled foam, or a longitudinal elongation increase of 23%, with only a 4% decrease in transverse elongation.

Twenty millimeter (mm)×150 mm samples of the z-axis peeled material and the y-axis peeled material were placed in a custom four-point probe resistance measuring fixture with a distance of 100 mm between a pair of sensing probes. Resistance was recorded as the potential drop, in millivolts, required to pass 1 ampere. Resistivity in ohms per centimeter (ohm/cm) was determined by dividing the potential drop by the current and length. The longitudinal resistivities of the comparative y-axis peeled foam and the z-axis peeled invention foam were 0.00157 ohm/cm and 0.00155 ohm/cm, respectively. Transverse resistivity for the y-axis peeled comparative product was 0.00234 ohm/cm. This compares with a resistivity of 0.00175 ohm/cm for the z-axis peeled invention product, or a resistivity improvement of 25%. Resistivity results are expressed in Table 1 as a resistance ratio of transverse to longitudinal resistivity. For the comparative foam, the resistance ratio was 1.49. For the z-axis peeled foam, the resistance ratio was 1.13. A resistance ratio of 1.0 is indicative of perfectly round pores. Therefore, the data indicate that the z-axis peeled invention product has just slightly elongated pores in the longitudinal direction.

Results of all testing for the comparative product as well as the invention material are presented in Table 1 below.

TABLE 1

| | Average Tensile Strength (kg/2cm) | | Average Elongation (Percent) | | Resistance Ratio |
|---|---|---|---|---|---|
| | Long. | Trans. | Long. | Trans. | |
| Comparative Foam (Y-axis Peeled) | 5.65 | 3.38 | 6.5 | 12.4 | 1.49 |
| Invention Foam (Z-axis Peeled) | 5.93 | 4.89 | 8.02 | 11.9 | 1.13 |

As can be seen from Table 1, z-axis peeling of the polymer foam provides for a plated foam product having greatly increased longitudinal elongation, without deleterious sacrifice in transverse elongation. Improved longitudinal elongation allows for increased loading of active material, which enables higher battery capacities. The invention product also has highly desirable increased longitudinal and transverse tensile strength. Additionally, the lower resistance of the invention product enables advantageous battery performance at higher drain rates.

EXAMPLE 2

There was again used a commercially available open cell foam prepared in loaf form, which was grade Z-110 polyurethane foam available from Foamex, Inc. The loaf was prepared and then three portions of the loaf were peeled. A single 300 (millimeter) mm wide roll was peeled around the x axis of one portion, the y axis of a second portion and, the z axis of the third portion. Each roll was then nickel plated and annealed as in Example 1.

Samples of 20 mm long×300 mm wide strips were cut from each roll and were then weighed. Weight for each sample was determined in g/m$^2$, as in Example 1. The standard deviation of the weight from 140 strips of the loaf portion peeled around the y-axis, 140 strips of the loaf portion peeled around the x-axis, and 140 strips of the loaf portion peeled from around the z-axis was determined as in Example 1. The standard deviation for the comparative y-axis and x-axis peeled products as well as the z-axis peeled invention material are presented in Table 2 below.

TABLE 2

| Foam Type | Std. Deviation(g/m$^2$) |
| --- | --- |
| Y-axis Peeled | 8.9 |
| X-axis Peeled | 6.2 |
| Z-axis Peeled (Invention Foam) | 4.1 |

As seen in Table 2, more uniform weight distribution is achieved from the invention, z-axis peeled product.

What is claimed is:

1. In the method of producing a three-dimensional reticulated sheet of polymeric foam from a prepared first mass of polymeric foam, wherein the prepared first mass of polymeric foam has a y axis length, an x axis width, and a z axis height, and said polymeric foam sheet can be produced from said prepared first mass by peeling said sheet from said first mass in a plane at least substantially parallel to said y axis length, the improvement in said method of producing polymeric foam sheet comprising the steps of:

establishing a second mass of foam from said prepared first mass of polymeric foam, said foam second mass retaining said x, y and z axes of said prepared first mass;

shaping said foam second mass for peeling said foam in a plane at least substantially parallel to said z axis; and peeling a sheet of polymeric foam, from the shaped foam second mass in a plane at least substantially parallel to said z axis.

2. The method of claim 1 wherein said first mass of polymeric foam is machine produced in a form selected from the group consisting of a log, a loaf or a bun, and said second mass of polymeric foam is established by cutting said form into a substantially cylindrical shape having a cylinder center line in the z axis direction.

3. The method of claim 1 wherein said second mass of polymeric foam is established by coring said prepared first mass of foam.

4. The method of claim 3 wherein said coring occurs along the z-axis of said prepared first mass of foam.

5. The method of claim 2 or 3 wherein said second mass of polymeric foam is smaller than said prepared first mass of foam.

6. The method of claim 1 wherein said x, y and z axes are established at 90° angles to one another.

7. The method of claim 1 wherein said shaped foam second mass is peeled by spinning said foam around said z axis.

8. The method of claim 7 wherein said spinning foam is engaged with a cutting means.

9. The method of claim 8 wherein said spinning foam cutting means is positioned parallel to said z axis.

10. The method of claim 1 wherein peeling a sheet of polymeric foam provides peeled foam sheet having a thickness in the range of from about 0.5 mm to about 10 mm.

11. The method of claim 1 wherein peeling a sheet of polymeric foam provides a sheet of open cell foam.

12. The method of claim 11 wherein peeling a sheet of polymeric foam provides said open cell foam sheet consisting of a multitude of pores having a pore size of from about 10 ppi to about 150 ppi.

13. The method of claim 12 wherein said multitude of pores of said foam sheet have a uniform pore aspect ratio in said longitudinal direction.

14. The method of claim 1 wherein said peeled foam sheet has an x-axis length, a y-axis thickness, and a z-axis width.

15. The method of claim 1 wherein peeling a sheet of polymeric foam proceeds in a continuous manner, producing a single continuous sheet from said foam second mass.

16. The method of making a battery electrode which comprises preparing a strip of foam sheet by the process of claim 1, coating said foam with an electroconductive material to prepare an electrode support member and applying an active material filling to said electrode support member.

17. A battery electrode containing one or more of said foam sheet made by the method of claim 1 or said electrode support member made by the method of claim 16.

18. A battery having a battery electrode made by the method of claim 16 and selected from the group consisting of nickel-cadmium, nickel-metal hydride and lithium ion batteries.

19. A method of producing an electrode for a battery, comprising the steps of:

providing a foam support member, with said support member having a multitude of pores;

establishing said foam support member in sheet form, having a sheet length in the longitudinal direction and a sheet width in the transverse direction, with said pores having a uniform pore aspect ratio in the longitudinal direction;

coating said foam support member with an electroconductive coating; and introducing active material into said sheet form electrode support member to produce an electrode in sheet form containing said material in said sheet.

20. The method of claim 19 wherein said foam support member is an open cell foam support member.

21. The method of claim 19 wherein said active material is selected from the group consisting of hydrogen absorbing, intercalating, lithiating and cadmium fillings.

22. A metal hydride secondary battery containing an electrode produced by the method of claim 19 as a negative or positive electrode.

23. A nickel-cadmium secondary battery containing the electrode produced by the method of claim 19 as a negative or positive electrode.

24. A lithium-ion battery containing the electrode produced by the method of claim 19 as a negative or positive electrode.

25. The electrode produced by the method of claim 19 wherein said foam support member is a polymeric foam selected from the group consisting of polyurethane, polyester, polyolefin, polyvinyl, polystyrene and polyamide reticulated foam.

26. The electrode produced by the method of claim 19 wherein said metal foam support member is in sheet form, and said sheet has a thickness in the range of from about 0.5 mm to about 10 mm and said pores have size within the range of from about 10 ppi to about 150 ppi.

27. The electrode produced by the method of claim 19 wherein said active filling is introduced into said foam support member by one or more of spray application, roll coating or pressure or vacuum application and said active filling is selected from the group consisting of hydrogen absorbing, intercalating, lithiating and cadmium fillings.

28. A battery having a battery electrode made by the method of claim 19.

29. A porous foam article, which article is a three-dimensional reticulated foam article having a substantially cylindrical outer surface, and having an x-axis radius, a y-axis radius and a z-axis height, wherein said outer surface is cylindrical around said z-axis, said article consisting of a multitude of pores, said article providing a uniform pore aspect ratio in the longitudinal direction for a sheet of foam severed from said article, wherein said sheet has longitudinal direction in the x-axis direction.

30. The article of claim 29 wherein said multitude of pores have a pore size from about 10 ppi to about 150 ppi.

* * * * *